Sept. 21, 1948.  R. W. POINTER  2,449,749
FIFTH WHEEL ASSEMBLY
Filed Nov. 28, 1945  2 Sheets-Sheet 1

Robert W. Pointer
INVENTOR
BY Harold D. Cook
ATTORNEY

Sept. 21, 1948.   R. W. POINTER   2,449,749
FIFTH WHEEL ASSEMBLY
Filed Nov. 28, 1945   2 Sheets-Sheet 2
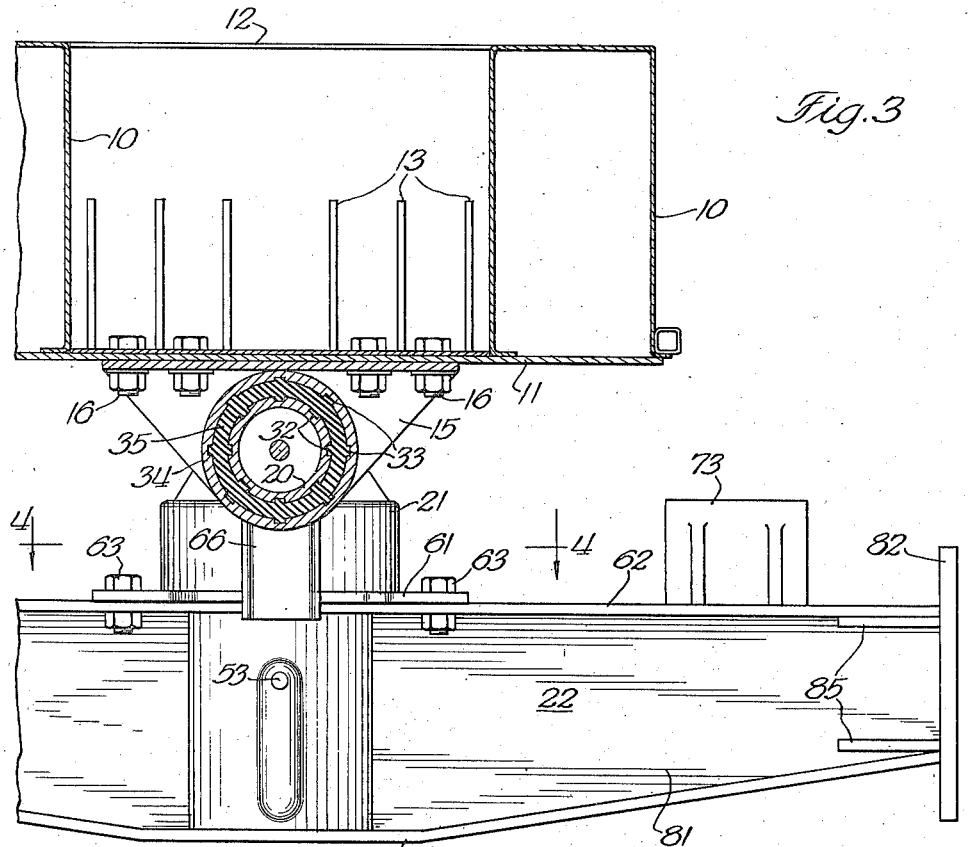
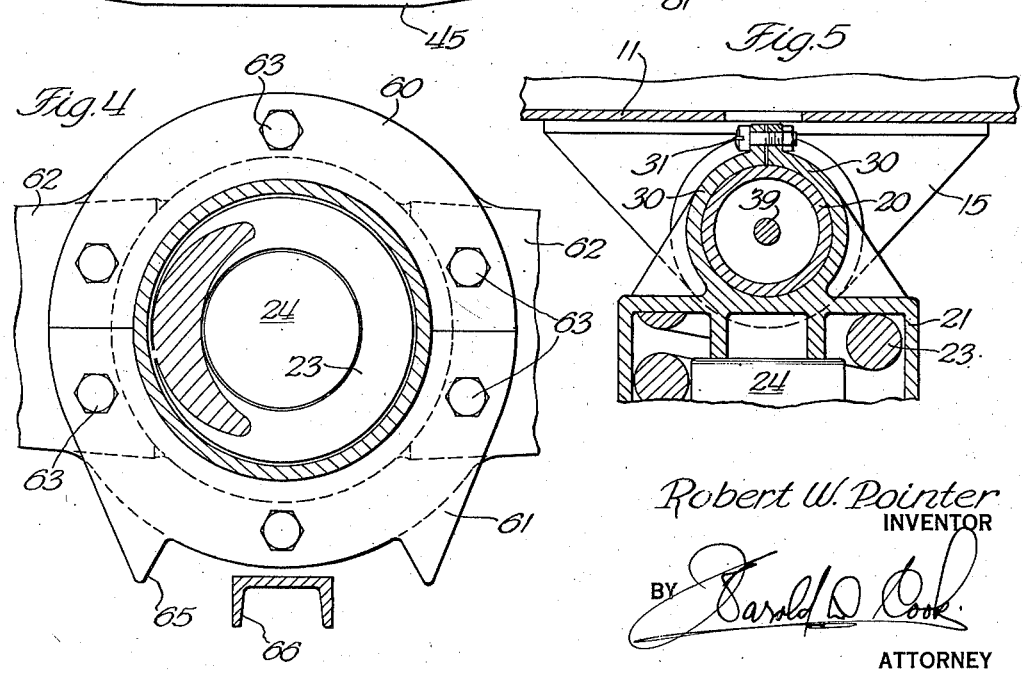
Robert W. Pointer
INVENTOR Patented Sept. 21, 1948

2,449,749

UNITED STATES PATENT OFFICE 2,449,749

FIFTH WHEEL ASSEMBLY

Robert W. Pointer, Portland, Oreg.

Application November 28, 1945, Serial No. 631,290

20 Claims. (Cl. 280—110)

This invention relates to a fifth wheel and front axle assembly for vehicles such as trailers and the like.

The invention pertains primarily to that class of vehicles commonly known as full trailers which are supported entirely on their own running gear and are pulled by a drawbar connected with a tractor unit. In such vehicles, the drawbar is attached to a steering front axle having a fifth wheel connection with the frame of the trailer. In conventional trailers the fifth wheel construction comprises generally a vertical king pin or king bolt pivotally connecting the front axle, or limber, with the frame of the vehicle. A bearing plate or track of some kind is usually provided on the upper surface of the axle, or limber, to form a bearing surface to support the weight of the trailer in any position in which the axle may be turned.

Such an arrangement gives rise to a considerable frictional drag in steering and presents a troublesome lubrication problem, inasmuch as the bearing surfaces cannot adequately be enclosed to keep dirt and water out and to keep lubricant in. A universal objective in vehicle design is the reduction of periodic service requirements, but as long as any part of the running gear must have frequent lubrication the advantage of eliminating service requirements in the other parts is greatly reduced. It is highly desirable to make trailer units entirely free of frequent service requirements so that they may be left at a loading or unloading station while the truck or tractor unit is being serviced. When this can be done, the trailer need not be taken out of operation as the loading and unloading time is ample to perform the usual routine service on the tractor, after which it can pick up the load and proceed without delay in the hauling of the goods.

Another objection to the conventional fifth wheel construction is that no provision is made for vertical oscillation of the front axle with respect to the trailer frame. When the trailer frame tilts or when the front axle oscillates in passing over uneven ground, the conventional fifth wheel bearing members tend to rock apart on one side of the king bolt and produce very high bearing loads over a small contacting surface on the other side of the king bolt. This not only tends to bind the pivotal action of the fifth wheel, but also tends to squeeze out the lubricant, whereupon it is lost so that it cannot return to the bearing surfaces. As a result, such bearing surfaces quickly tend to become dry and gritty. The relative inflexibility of the front axle mounting in conventional fifth wheel suspensions is even more objectionable in its tendency to twist the vehicle frame. In tank trailers this action is especially serious as it opens the seams and produces leaks after relatively short periods of use on rough roads.

The general object of the present invention is to provide an improved fifth wheel assembly which will overcome the above shortcomings and which, further, will be of rugged construction, economical to build and maintain. In the accomplishment of this general objective, particular objects are to provide a combined fifth wheel and front axle assembly having relatively little friction as an inherent quality and being self-lubricated so as not to require frequent lubrication service.

A further object is to provide a fifth wheel assembly which includes a spring and shock absorber suspension for supporting the front end of the vehicle.

A further object is to provide a fifth wheel assembly designed to accommodate vertical oscillation of the front axle relative to the vehicle frame without binding or otherwise impeding the steering action and without stressing the vehicle frame.

A further object is to provide an improved fifth wheel and front axle assembly embodied in an axle beam of hollow box construction adapted to mount removable wheel spindles and having drawbar attachments above axle level.

A still further and more particular object is to provide a fifth wheel assembly comprising a longitudinal trunnion carrying the front end of the vehicle frame on a pivotal spring and shock absorber assembly having enclosed bearing plates submerged in an oil chamber in an axle beam.

Other objects reside in the construction and arrangement of parts described and illustrated in connection with a preferred embodiment of the invention shown in the accompanying drawings. The drawings are referred to for purposes of illustration only and not for the purpose of limiting the invention, as various changes and equivalents will suggest themselves to persons skilled in the art. The invention is to be limited only by the scope of the appended claims.

In the drawings:

Figure 3 is a cross sectional view taken on the line 3—3 of Figure 2 and looking forward toward the front axle;

Figure 4 is a view taken on the line 4—4 of Figure 3; and

Figure 5 is a sectional view taken on the line 5—5 of Figure 2.

Figure 1:
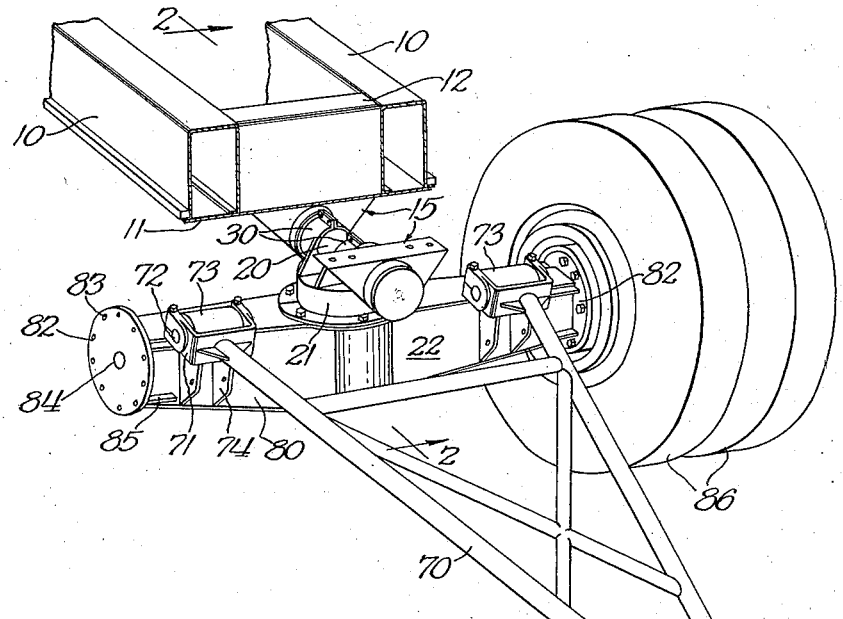
Figure 1 is a perspective view of the front end of a trailer embodying the principles of the present invention, one wheel and spindle being removed and the front end of the frame being broken away to more clearly show the fifth wheel construction.

The invention is embodied in a front axle beam of hollow box construction having a spring and shock absorber unit housed in a cylinder well in the center of the beam. This unit bears upon a plurality of floating wear plates capable of relative rotation in the bottom of the cylinder which is fully enclosed and sealed against outside water and dirt and partly filled with lubricating oil. The unit provides rotatable spring support for a horizontal longitudinal trunnion which carries rubber mounted trunnion tube hangers attached to the vehicle frame. The trunnion is thus arranged to accommodate relative tilting between the vehicle and front axle through the resilience of the rubber mounting so that the front axle will steer smoothly and will not twist the frame on uneven road surfaces.

Referring now to the preferred embodiment shown in the drawings, the numeral 10 indicates the longitudinal frame members of the trailer, these members being bridged at the front end of the frame by a flat bottom plate 11 and a pair of transverse channel members 12. Both cross channels 12 appear in Figure 2, the front part of the frame being broken away in Figure 1 so as to eliminate the front channel member. These channel members are braced and stiffened by a plurality of triangular gusset plates 13 for supporting the front end of the vehicle on the fifth wheel assembly between the frame members 10.

Figure 2:
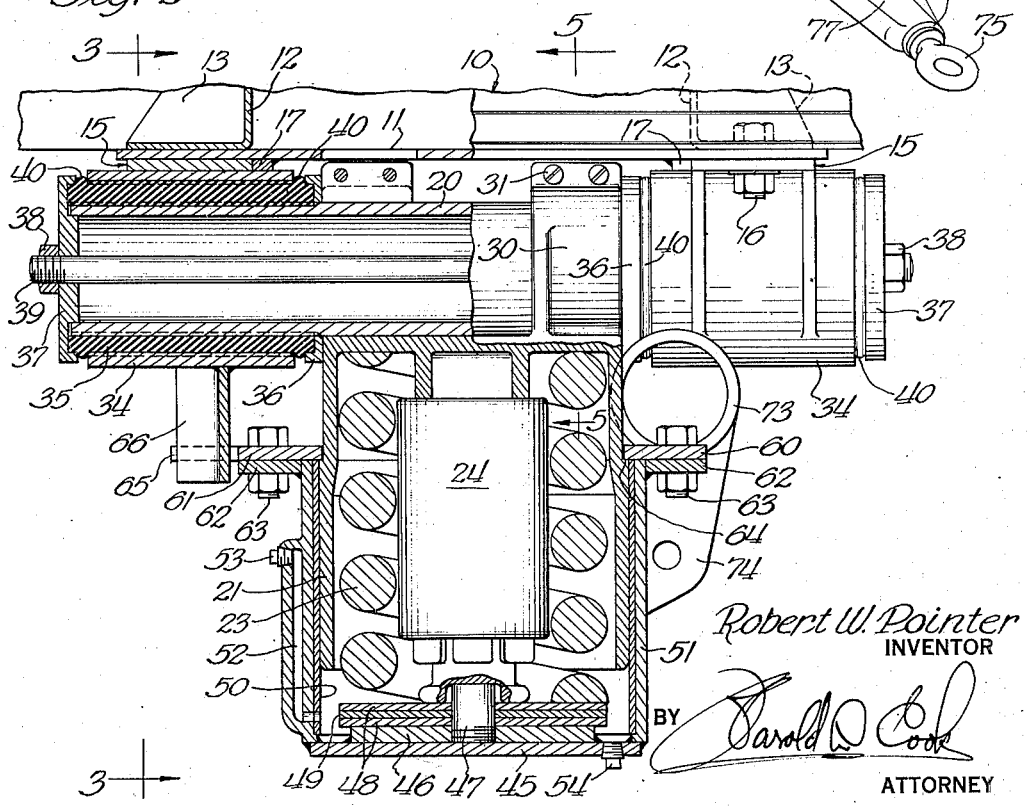
Figure 2 is a fragmentary sectional view through the fifth wheel assembly, taken on the line 2—2 of Figure 1, certain parts being shown in elevation.

A trunnion tube hanger 15 is secured beneath each of the cross channels 12 by means of bolts 16 passing through the channel flanges and through the bottom plate 11. A pair of shear lugs 17 are securely welded to the bottom plate 11 in abutting relation with the trunnion tube hangers, as shown in Figure 2, to transmit the drawbar pull to the frame in moving either forward or backward so that the bolts 16 are not required to take this stress. The trunnion tube hangers 15 support the vehicle upon a longitudinal trunnion tube 20 carried by a vertical cylinder or barrel 21. The barrel 21 is mounted for both relative rotation and vertical movement within the front axle beam 22 and contains a coil spring 23 and shock absorber 24 constituting a spring suspension for the front end of the trailer. In general, the axle pivots around the barrel 21 to steer the vehicle, and the barrel and axle oscillate in the trunnion tube hangers 15 to accommodate tilting movement while spring action produces vertical movement of the barrel within the axle. Various details of this general arrangement will now be described as they relate to the further accomplishment of the objects of the invention.

The barrel 21 is surmounted by a pair of integral split clamps 30 which may be tightened by means of screws 31 to grip the central part of the trunnion tube 20 to effect a rigid attachment thereto. The ends of the trunnion tube have external longitudinal grooves 32, and directly opposite these grooves are complementary internal grooves 33 in tubes 34 in the trunnion tube hangers 15. Rubber trunnion bushings 35 having inner and outer ribs filling the grooves 32 and 33, respectively, provide resilient mountings for the trunnion tube in the trunnion tube hangers. Cupped retaining washers 36 and cupped end washers 37 enclose and confine the ends of the bushings whereby nuts 38 may be tightened on the ends of a tie bolt 39 to axially compress the rubber bushings and raise a bulge 40 over the edge of each cup washer. The bulges 40 are effective to maintain the hanger tubes 34 in longitudinally fixed positions on the trunnion tube 20 spaced intermediate the washers 36 and 37. If desired, a pair of flanged bushings may be substituted for each of the bushings 35, the flanges taking the place of the bulges 40. The grooves 32 and 33 insure that any rotational movement between the trunnion tube and hanger tubes will stress and flex the rubber bushings and will not produce a permanent slipping between the concentric parts whereby they always tend to return to the same position.

The weight of the vehicle supported upon the outer ends of the trunnion tube 20 is transmitted to the barrel 21 from whence it is ultimately brought to bear upon a bottom plate 45 of the axle beam. Between the barrel 21 and the bottom plate 45 are interposed the previously mentioned spring 23 and shock absorber unit 24 and a plurality of anti-friction wear plates to accommodate the pivotal action of the axle in steering the vehicle. A plate 46 secured on the bottom plate 45 carries an upstanding post 47 centering a pair of steel wear plates 48 and an interposed bronze wear plate 49 stacked beneath the spring 23. The post 47 also centers the shock absorber unit 24 which engages the head of the barrel and rests upon the stack of wear plates within the convolutions of the spring. Surrounding the shock absorber 24 the spring 23 thereby supports the head of the barrel and bears its weight downwardly upon the stack of wear plates. To provide pivotal bearing for the axle in steering, the barrel 21 is relatively rotatable in a bronze bushing 50 which lines a steel tube 51 secured in the axle. This tube is sealed at the bottom to constitute a cylindrical reservoir adapted to contain sufficient lubricating oil to keep the plates 48 and 49 submerged. A passage 52 external to the bushing 50 is equipped with a level plug 53 for maintaining the oil at the proper level. A drain plug is indicated at 54 and a filler opening with a plug may be provided in the upper end of the barrel.

A pair of retaining ring segments 60 and 61 are secured on a top plate 62 of the axle beam by means of bolts 63 so as to completely surround and closely encircle the barrel 21. The lower end of the barrel where it bears in the bushing 50 is of slightly larger diameter than the upper end extending thereabove, and between these two parts of different diameter a small shoulder 64 is formed which is stopped by the retaining ring segments 60 and 61 to limit the upward travel of the barrel, the barrel being assembled in the cylinder with the spring 23 under slight compression. The rear retaining ring segment 61 is notched, as shown at 65, on opposite sides of a stop member 66 attached to the rear hanger tube 34, the angular extent of the notch 65 being determined by the amount of axle movement permitted by the particular type of body mounted on the trailer frame. In manufacturing fifth wheel assemblies for use with different types of trailer bodies, the notch is made originally for a certain minimum travel and may then be cut wider depending upon the width of the vehicle on which it is to be installed.

A drawbar 70 is attached to the front axle for pulling the trailer. Yokes 71 on the shafts of the drawbar carry pins 72 mounted in rubber bushings within tubular members 73 on brackets 74 affixed to the front side of the axle. The brackets 74 hold the tubes 73 at a height approximately midway between the wheel spindles and the shear lugs 17 when the vehicle is loaded to best exert the necessary tractive effort in both accelerating and decelerating the vehicle. The leading end of the drawbar is provided with a tubular sleeve containing the shank of an eye bolt 75 having washers 76 for compressing a rubber bushing in the sleeve when the nut 78 is tightened. These rubber bushings in the drawbar connections absorb shocks from jerky movements and transmit a more uniform tractive effort to the trailer.

The structural elements of the axle beam comprise, in addition to previously mentioned bottom plate 45, and top plate 62, a vertical front plate 80 to which the brackets 74 are attached, and a vertical rear plate 81. These four plates, when properly bonded together, form a hollow box beam of great strength. Flanges 82 having bolt holes 83 are rigidly secured to the ends of the axle beam and braced by gusset plates 85 for mounting removable axle spindles. A central opening 84 in each flange admits hydraulic and bleeder lines from brake assemblies carried by the wheel spindles. Figure 1 shows a dual wheel assembly 86 mounted on one end of the axle. On the other end of the axle the wheel and spindle have been removed to show the spindle mounting flange 82.

Thus, it is seen from the foregoing description that the present fifth wheel assembly includes also a spring and shock absorber suspension and a longitudinal trunnion to accommodate tilting of the front axle. The trunnion is rubber mounted so as to require no lubrication. The bearing elements for the pivotal action of the fifth wheel are not only sealed away from water and dirt but are submerged in an oil reservoir so as to be always adequately lubricated. As far as the moving parts of the fifth wheel construction are concerned, the vehicle may be left in operation for long periods of time without lubrication or other servicing, and, being adequately supplied with lubricant, the wearing parts are assured of long life. Whenever it does become necessary to replace the steel and bronze wear plates 48 and 49, they may easily be made accessible by merely removing the retaining ring segments 60 and 61 and jacking up the front end of the trailer frame.

The principal elements of the present fifth wheel assembly may be modified for use as a fifth wheel connection between a tractor unit and a semi-trailer, and all such related uses within the scope of the appended claims are included in the invention.

Having now described my invention and in what manner the same may be used, what I claim as new and desire to protect by Letters Patent is:

1. In a vehicle front axle fifth wheel construction, a longitudinal trunnion supporting a vehicle frame for tilting movements relative to said axle, and pivotal means for mounting said trunnion for relative rotation in said axle comprising a vertical cylinder in said axle, a barrel in said cylinder carrying said trunnion, and resilient means bearing in the bottom of said cylinder supporting said barrel for vertical and rotative movement relative to said cylinder.

2. A vehicle fifth wheel assembly comprising a longitudinal trunnion supporting a vehicle frame, and means for mounting said trunnion for relative rotation in an axle beam, said means including a spring and shock absorber assembly.

3. A fifth wheel assembly comprising a longitudinal trunnion supporting one end of a vehicle frame, an axle beam having a vertical cylinder therein, a barrel in said cylinder carrying said trunnion, a resilient support within said barrel, and a thrust bearing for said resilient support in said cylinder to allow relative rotation of said barrel in said cylinder under load.

4. A fifth wheel assembly comprising a longitudinal trunnion supporting one end of a vehicle frame, a vertical supporting cylinder, a barrel in said cylinder supporting said trunnion, and a coil spring in said cylinder supporting said barrel.

5. In a vehicle fifth wheel assembly, a longitudinal trunnion supporting one end of the vehicle, an axle beam having a vertical cylinder therein, a spring and shock absorber assembly in said cylinder, and a barrel resting on said spring and shock absorber and supporting said trunnion for relative rotation in said cylinder.

6. A fifth wheel assembly comprising a longitudinal trunnion supporting one end of a vehicle, an axle beam, a vertical cylinder having its lower end sealed in said axle beam, a floating bearing plate at the bottom of said cylinder, a coil spring resting on said plate, an oil bath in said cylinder covering said bearing plate, and means carried by said spring and rotatable in said cylinder for supporting said trunnion.

7. A vehicle fifth wheel assembly comprising a longitudinal trunnion supporting one end of the vehicle, a vertical supporting cylinder constituting an oil reservoir, a floating bearing plate in the bottom of said cylinder, a coil spring and shock absorber supported on said plate, and a barrel member carrying said trunnion on said spring and shock absorber for relative rotation in said cylinder.

8. In a vehicle fifth wheel assembly, a vertical supporting cylinder, a coil spring in said cylinder, a longitudinal trunnion, means for supporting said trunnion on said spring for relative rotation in said cylinder, a resilient bushing on said trunnion, and a tubular member enclosing said bushing for supporting one end of said vehicle on said trunnion.

9. In a vehicle fifth wheel assembly, a tubular trunnion hanger, a resilient bushing therein, a longitudinal trunnion in said bushing, and means for supporting said trunnion for relative rotation in a supporting member.

10. In a vehicle fifth wheel assembly, a pair of tubular trunnion hangers secured to the vehicle frame, resilient bushings therein, a longitudinal trunnion in said bushings, means on the ends of said trunnion to longitudinally compress said bushings to bind them into firm engagement with said trunnion and trunnion hangers, and means for supporting said trunnion for relative rotation in a supporting member.

11. A vehicle fifth wheel suspension comprising a pair of spaced tubular trunnion hangers secured to the vehicle frame, resilient bushings therein, a longitudinal trunnion mounted in said bushings, and means supporting said trunnion between said hangers for relative rotation in a supporting member.

12. A vehicle fifth wheel assembly comprising a pair of spaced tubular trunnion hangers secured to the vehicle frame, resilient bushings therein, a trunnion mounted in said bushings, means on the ends of said trunnion for longitudinally compressing said bushings to bind said trunnion longitudinally in said hangers, an axle beam, a vertical cylinder in said axle beam, a spring in said cylinder, and a barrel in said cylinder secured to said trunnion between said hangers for supporting said trunnion on said spring for relative rotation in said axle beam.

13. In a fifth wheel assembly, an axle beam, a vertical cylinder in said axle beam, a spring in said cylinder, a longitudinal trunnion supporting one end of a vehicle frame, a cylindrical member supporting said trunnion on said spring for relative rotation in said cylinder, and a pair of drawbar connections on said axle beam at a height intermediate between the axle level and the trunnion level.

14. In a vehicle fifth wheel and front axle assembly, an axle beam, a vertical cylinder in the center of said axle beam to house a spring and shock absorber assembly for carrying one end of the vehicle, and bearing means in the bottom of said cylinder to support said spring and shock absorber assembly for relative rotation in said cylinder in steering said axle, said cylinder being constructed and arranged to contain a quantity of oil to lubricate the parts therein.

15. In a vehicle fifth wheel and front axle assembly, an axle beam of rectangular hollow box construction, a vertical fifth wheel cylinder contained within the mid portion of said box construction, flanges on the ends of said axle beam for attaching demountable spindles, and a pair of drawbar connections on said axle beam above the spindle height.

16. A front axle comprising an axle beam of hollow box construction, a vertical fifth wheel cylinder contained within the mid portion of said beam, a pair of tubular drawbar connections on said beam, resilient bushings therein, pins mounted in said bushings, and a drawbar having yoke ends secured to said pins.

17. A fifth wheel and front axle assembly comprising an axle beam of hollow box construction, a vertical cylinder in the center of said beam forming an oil reservoir, a center post in the bottom of said cylinder, a plurality of floating bearing plates centered on said post, a shock absorber centered on said post and bearing on said plates, a coil spring around said shock absorber and bearing on said plates, and a cylindrical member rotatable in said cylinder for supporting a vehicle frame on said spring and shock absorber.

18. A vehicle fifth wheel assembly comprising a tubular trunnion hanger secured to the frame of the vehicle, a trunnion resiliently mounted therein, an axle beam having a vertical cylinder in the center thereof, a spring in said cylinder, a cylindrical member supporting said trunnion on said spring for relative rotation in said cylinder, an annular shoulder on said cylindrical member, a retaining ring removably secured to said axle beam to engage said shoulder and retain said member in said cylinder, a stop projecting from said trunnion hanger, and means on said retaining ring engageable with said stop to limit the turning angle of said axle beam.

19. A vehicle fifth wheel assembly comprising a longitudinal trunnion carrying the front end of the vehicle on a pivotal spring and shock absorber assembly said pivotal assembly having enclosed floating bearing plates submerged in an oil chamber for supporting the weight carried thereby.

20. A vehicle fifth wheel assembly for a front axle comprising a longitudinal trunnion carrying the front end of the vehicle on a pivotal spring and shock absorber assembly, said pivotal assembly having enclosed floating bearing plates submerged in an oil chamber in said axle.

ROBERT W. POINTER.

REFERENCES CITED

The following references are of record in the file of this patent:

UNITED STATES PATENTS

| Number | Name | Date |
|---|---|---|
| 726,209 | Wilson | Apr. 21, 1903 |
| 847,647 | Calkins | Mar. 19, 1907 |

FOREIGN PATENTS

| Number | Country | Date |
|---|---|---|
| 77,721 | Germany | Aug. 11, 1919 |
| 410,501 | France | Mar. 15, 1910 |
| 481,622 | Great Britain | Mar. 15, 1938 |